United States Patent
Chagoly et al.

(10) Patent No.: US 7,552,212 B2
(45) Date of Patent: Jun. 23, 2009

(54) INTELLIGENT PERFORMANCE MONITORING BASED ON USER TRANSACTIONS

(75) Inventors: Bryan Christopher Chagoly, Austin, TX (US); Xiaoping Chen, Austin, TX (US); Andrew Jason Lavery, Austin, TX (US); Howard Milton McKinney, Austin, TX (US); Kirk Malcolm Sexton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 10/971,472

(22) Filed: Oct. 22, 2004

(65) Prior Publication Data

US 2006/0107255 A1 May 18, 2006

(51) Int. Cl.
*G06F 15/16* (2006.01)
*G06F 15/173* (2006.01)
*G06F 15/177* (2006.01)

(52) U.S. Cl. .................. 709/224; 709/203; 709/217

(58) Field of Classification Search ............. 709/203, 709/217–228
See application file for complete search history.

(56) References Cited

U.S. PATENT DOCUMENTS

| | | | |
|---|---|---|---|
| 5,557,548 A | 9/1996 | Gover et al. | 364/551.01 |
| 5,729,726 A | 3/1998 | Levine et al. | 395/580 |
| 5,748,855 A | 5/1998 | Levine et al. | 395/800.23 |
| 5,751,945 A | 5/1998 | Levine et al. | 395/184.01 |
| 5,752,062 A | 5/1998 | Gover et al. | 355/800 |
| 5,787,409 A | 7/1998 | Seiffert et al. | 706/45 |
| 5,835,705 A | 11/1998 | Larsen et al. | 395/184.01 |
| 5,881,306 A | 3/1999 | Levine et al. | 395/800.23 |
| 5,938,760 A | 8/1999 | Levine et al. | 712/220 |
| 5,949,971 A | 9/1999 | Levine et al. | 395/184.01 |
| 5,960,198 A | 9/1999 | Roediger et al. | 395/704 |
| 5,970,439 A | 10/1999 | Levine et al. | 702/186 |
| 5,991,708 A | 11/1999 | Levine et al. | 702/186 |
| 6,052,708 A | 4/2000 | Flynn et al. | 709/108 |
| 6,108,782 A * | 8/2000 | Fletcher et al. | 713/153 |
| 6,185,615 B1 * | 2/2001 | Labiaga et al. | 709/224 |
| 6,453,268 B1 | 9/2002 | Carney et al. | 702/186 |
| 6,483,813 B1 | 11/2002 | Blencowe | 370/252 |
| 6,530,042 B1 | 3/2003 | Davidson et al. | 714/47 |
| 6,539,502 B1 | 3/2003 | Davidson et al. | 714/47 |
| 6,665,716 B1 | 12/2003 | Hirata et al. | 709/224 |
| 6,801,940 B1 * | 10/2004 | Moran et al. | 709/224 |
| 6,807,636 B2 * | 10/2004 | Hartman et al. | 726/14 |
| 6,816,897 B2 * | 11/2004 | McGuire | 709/223 |
| 6,839,751 B1 * | 1/2005 | Dietz et al. | 709/224 |
| 6,954,789 B2 * | 10/2005 | Dietz et al. | 709/224 |
| 2003/0036883 A1 | 2/2003 | Mericas | 702/186 |
| 2003/0097438 A1 * | 5/2003 | Bearden et al. | 709/224 |
| 2005/0188080 A1 * | 8/2005 | Motsinger et al. | 709/224 |
| 2006/0294238 A1 * | 12/2006 | Naik et al. | 709/226 |

* cited by examiner

*Primary Examiner*—Haresh N Patel
(74) *Attorney, Agent, or Firm*—Yee & Associates, P.C.; Jeffrey S. LaBaw

(57) ABSTRACT

A system and method to allow an individual transaction in an instrumented software application to be monitored according to its own configuration. In one preferred embodiment, each transaction is associated with a token. The token includes the monitoring configuration that should be used for the associated transaction. When the application entry point is reached for the transaction, the token is looked up and retrieved, and the monitoring policy configuration of the token determines what data is gathered about the transaction.

3 Claims, 2 Drawing Sheets

INTELLIGENT PERFORMANCE MONITORING BASED ON USER TRANSACTIONS

BACKGROUND OF THE INVENTION

1. Technical Field

The present invention relates generally to monitoring software performance, and specifically to selective monitoring of individual transactions in an instrumented software application.

2. Description of Related Art

One key task in system administration is to monitor the performance and availability of software applications, including those that may spread across multiple physical systems involving multiple physical resources. Typically, this monitoring is performed by instrumenting the software to include additional instructions, called "probes," to report performance information, such as application response time. Performance monitoring may also be implemented in an enterprise by adding an additional software component, sometimes called a plug-in, to the application that is invoked inline during the execution of the transaction. Since the monitoring is performed in real-time, any such monitoring causes some degree of run-time performance overhead on the monitored systems. Thus, it is important to provide a control mechanism to configure the monitoring activity at an adequate granularity.

Existing approaches include selectively turning the monitoring on or off based on the application or logic component. For example, when a user initiates a transaction from a Web browser, the request is sent to a Web server, which in turn makes a call to an application server and a database server. The request is then translated into database access operations. Traditionally, if the user experienced a performance problem, the entire application that runs on the Web server, the application server, and the database server would be monitored in order to pinpoint the root cause of the problem. However, there are two major drawbacks to this methodology.

First, when transaction monitoring is enabled for an application, all business transactions in that application are monitored, regardless of whether or not they are relevant to identify the performance problem. This incurs more overhead in terms of CPU usage, memory, etc. than necessary to solve the problem.

Second, when transaction monitoring is enabled for an application, every transaction in the application will generate additional monitoring information at the same level. The accumulated data volume can become very high within a short period of time, thus incurring additional overhead to process the data. The high data volume can also obscure the root cause of the problem in that there is a large quantity of irrelevant data for the user to review and ultimately ignore.

Hence, the inventors have recognized the state of the art would be improved by a refined way to monitor applications that avoids or reduces the overhead cost of monitoring.

SUMMARY OF THE INVENTION

The present invention provides a method, system, and computer program instructions for allowing an individual transaction in an instrumented software application to be monitored according to the individual transaction's configuration. In one preferred embodiment, each transaction is associated with a token. The monitoring configuration that should be used for the associated transaction is embedded in or described by the token. The token may contain a pointer or reference to the actual configuration, which may be defined somewhere else in the monitoring application. The instrumentation uses the configuration information contained in the token to determine what information, if any, should be monitored and reported for the given transaction. When an application entry point is reached for the transaction, the probe queries a user defined monitoring policy to identify if this transaction should be monitored. If this is a monitored transaction, the probe receives a valid token containing the transaction's specific monitoring configuration which determines what data is gathered about the transaction.

Thus, in preferred embodiments, each transaction to be monitored can be dynamically associated with a monitoring configuration, and the monitoring configurations can be optimized for the particular transactions. This allows information to be gathered in a more selective way (i.e., only the needed information from the relevant transactions is gathered), avoiding much of the overhead incurred with prior art monitoring methods, wherein an entire application is monitored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
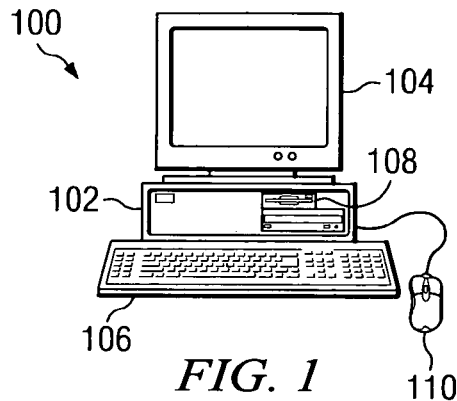
FIG. 1 shows a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
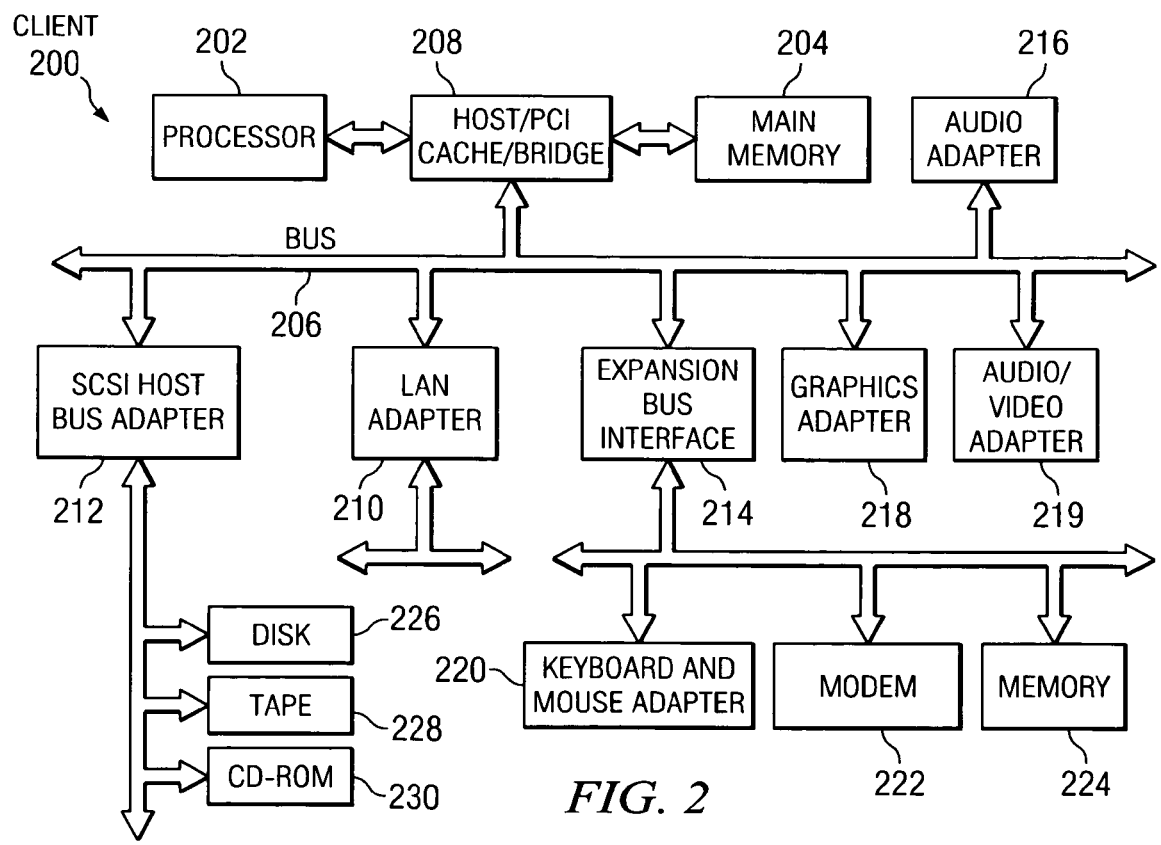
FIG. 2 shows elements of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a way to allow individual transactions in an instrumented software application to be monitored according to a configuration associated with the transaction. Transactions are computer operations that are initiated by a user. A user transaction may be composed of downstream sub-transactions. For example, when a user logs on to www.amazon.com to buy a book, the user has initiated a transaction. The original request is, for example, sent to a Web server and then to an application server such as a Java server. The transaction may further invoke database operations in the form of sub-transactions. Transactions can also include the chain of sub-transactions initiated by the original request. Such requests can be made, for example, from a Web browser.

In a preferred embodiment, each transaction is associated with a token. A token is a piece of data that uniquely identifies an instance of a monitored transaction and contains, among other things, the configuration information required by the probe to determine the appropriate level of detail to record for the transaction. The token is passed between computing entities to allow the child sub-transaction to identify its parent transaction. Such a token includes the monitoring configuration that should be used for the transaction. When the token is used by the instrumentation, it allows each transaction to be monitored according to an optimal configuration for that transaction. The configuration is preferably captured in policies, and one policy can be associated with one or more transactions. Further, a token, or the information contained within the token, can be associated with more than one transaction. Thus, by dynamically adjusting the policies and associated tokens, transactions of an application can be monitored with a selectivity and granularity surpassing that of prior art systems.

For example, one individual transaction or a group of transactions can be monitored according to a first policy, meaning certain information, specified by the policy, is gathered about the transaction. Other transactions in the same application may be monitored according to a second policy, meaning other information is gathered as specified in the second policy. Some transactions need not be monitored at all. According to the invention, any number of policies can be put in place, and various transactions can be monitored in different ways by associating respective transactions with respective differing sets of policies. Because the present invention allows for specific information about a transaction to be selectively collected, it can minimize the computational overhead associated with monitoring transactions and reduce the amount of data generated by transaction monitoring. Further, as will be discussed below, as the policies are associated with tokens that are retrieved by the instrumentation at runtime, the information to be gathered may be dynamically tailored to match a specific, current problem.

Different policies will tend to generate different amounts and types of data. For example, if policy 1 generates a response time, policy 2 may generate a kilobyte worth of data, including response time, hostname, username, and additional context information for the monitored transaction. If only the response time from a transaction is needed, users can specify policy 1 to monitor the transaction.

In preferred embodiments of the invention, each instrumented application has entry points for requests or transactions that should be monitored. An entry point, or edge transaction, is the first location in the monitored application where a transaction is recorded by the monitoring application. For example, a Web Application Server may satisfy Web page requests, and the request could be defined as a URL, such as http://www.ibm.com/buycomputers. A Web server plug-in that is listening for incoming HTTP requests may identify this URL and detect if it matches a given monitoring policy. Alternatively, a probe that has been inserted into an instrumented Java application server could intercept all servlet requests and identify the incoming HTTP request and URL in a similar fashion. If the identified URL matches a given monitoring policy, it is recorded as a transaction and used to represent the entry point into the monitored application. Other possible entry points include transactions over Web Services, Remote Method Invocation (RMI), Java Database Connectivity (JDBC), Java Connection Architecture (JCA), Java Message Service (JMS), .NET, shell scripts, etc.

In the present invention, once entry points are defined for an application, tokens are associated with instances of transactions recorded at those entry points. The tokens contain, or reference, the monitoring policies that include the necessary information to monitor the transaction.

Figure 3:
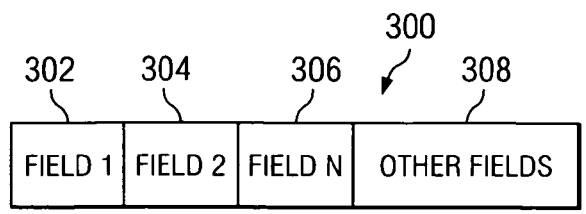
FIG. 3 shows a policy configuration token consistent with implementing a preferred embodiment of the present invention.

An example policy configuration token is depicted in FIG. 3. In this illustrative example, the token is defined as a byte array with certain bytes signifying the monitoring configuration and trace levels for certain transactions in the monitored application. Token 300 is shown to comprise several fields, including Field 1 302, Field 2 304, and Field 3 306. Field 1 302 contains the configuration for monitoring policy component A, occupying some arbitrary number of bytes. Field 2 304 contains the configuration for monitoring policy component B. Field N 306 contains the configuration for monitoring policy N, and so on. Other Fields 308 contain information unrelated to monitoring policy, if needed. In preferred embodiments, if an edge transaction is submitted to be monitored and the identification information about the transaction does not match a corresponding monitoring policy, then the monitoring application returns a token with no monitoring configuration defined, or no reference to a monitoring configuration. An absence of a monitoring configuration in the token indicates the transaction should not be monitored. This empty token is also then passed downstream to all subtransactions to signify that no downstream transactions should be monitored.

In one preferred embodiment of the present invention, a probe, or other similar instrumentation in the application, monitors entry points, or locations in the application where transactions occur. The probe may use identification information about the transaction (e.g., a URL or a specific ID given in the transaction) to map to a predefined monitoring policy for the transaction. A transaction is uniquely identified by supplying a regular expression to match the following parameters: host name, user name, application name, and transaction name. Other key values can also be used to uniquely identify a transaction if needed. For a monitored transaction to match a predefined monitoring policy, all key parameters must match. Because the policy is defined using regular expressions, wildcards can be supplied to define a generic policy that matches all recorded transactions.

Each monitoring policy contains the above mentioned transaction identification information and several other pieces of information. Policies also contain scheduling information, thresholds, and configuration policies. The schedule defines when the matching transactions will be recorded, a list of user defined thresholds that are triggered if a transaction's execution time exceeds the defined limit, and the configuration policy that determines the level of tracing to be used when recording the transaction and subtransactions.

The probe supplies all of the transaction identification information at runtime, when the transaction is being run. The monitoring application then compares that information against the set of defined policies and if a match is detected, a valid token is returned to the probe with a valid monitoring configuration defined. Examples of transaction names include a URL like http://www.ibm.com or a Java method signature like com.ibm.MyClass.myMethod (String arg1, int arg2). Other examples of transaction names include SQL statements, Web Service method signatures, JMS message IDs, etc. The probe acquires this policy configuration information by supplying the collected key parameters to a policy mapper and in turn receiving a token. A policy mapper is a mechanism in a management server for mapping a policy to a transaction being monitored. The policy mapper may comprise an ARM engine, which is an implementation specific component used for collecting response time metrics, and a monitoring engine, which is an agent process responsible for matching the collected transaction information with the list of user defined monitoring policies. In contrast to the policy mapper of the present invention, the traditional way of configuration monitors the whole application at the same level. In the prior art, no matter whether the particular transaction instance is related to the performance problem, the same amount of information would be collected in typical known systems. This incurs unnecessary overhead in terms of CPU and memory usage.

Figure 4:
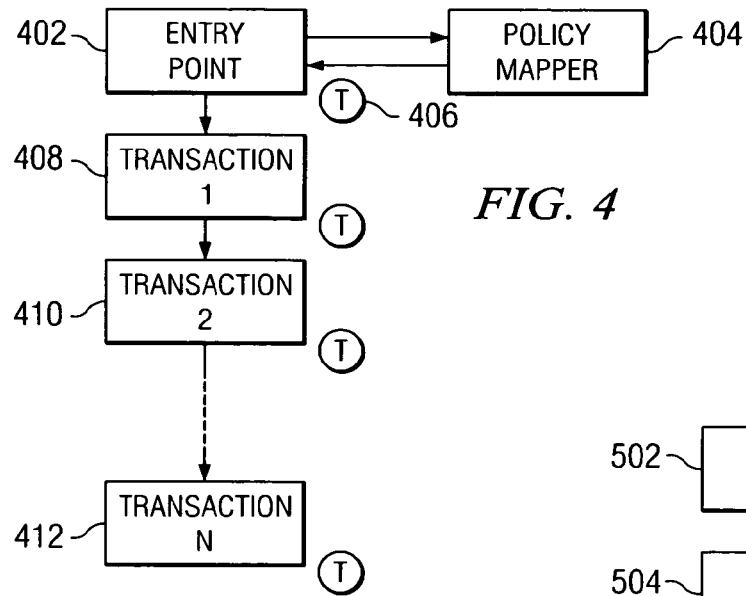
FIG. 4 depicts use of a token in a transaction consistent with a preferred embodiment of the present invention.

FIG. 4 depicts the use of a token in a transaction that actually comprises several transactions, or sub-transactions, across a distributed system. Though the term "sub-transactions" is used herein to refer to such nested transactions, the process of token association and monitoring of all types of transactions is preferably essentially the same.

First, execution reaches an entry point 402 in the application. The instrumentation or probe monitors the entry point 402 by calculating the transaction's execution response time and by collecting all the key parameters. When an entry point is reached, the probe is executed inline with the transaction and the probe requests the policy configuration token 406 associated with the transaction from the policy mapper 404. For example, in one preferred embodiment, the request may be implemented as part of Application Response Measurement (ARM), which is a standard for measuring response times and status of transactions. Information regarding the manner by which requests may be made to a policy mapper may be obtained from the ARM Specification, version 4.0, which is hereby incorporated by reference.

The policy mapper maintains the defined list of monitoring policies. When a request is made to the policy mapper, the policy mapper attempts to match all key parameters in the request in order to uniquely match the transaction with a defined monitoring policy. When a match is made, the policy mapper generates a unique token, part of which contains the monitoring configuration that identifies the level of recording for monitored application components that are part of this transaction.

The probe may use the identification information about the transaction (such as the URL from which the request originated or a specific transaction ID given to the transaction) to map to a predefined configuration token for the transaction.

As described above, many ways of uniquely identifying a particular transaction will occur to those skilled in the art. In some preferred embodiments, the token 406 is associated with all transactions 408, 410, 412 or "sub-transactions" that make up the total transaction.

The policy defined in the policy configuration token describes whether the transaction should be monitored, and if so, what information should be gathered. An example of how the probe could determine how to monitor the transaction is based on the policy configuration token being implemented as a byte array. In the array, particular indexes are defined to indicate the monitoring level for defined locations within the monitored application. For example, two bits in the token could be defined to provide the monitoring details for all servlets in a J2EE application server. Bits set to 00 would signify tracing for this component is disabled while bits set at 11 would indicate for the probe to collect the maximum amount of tracing information for the component.

Figure 5:
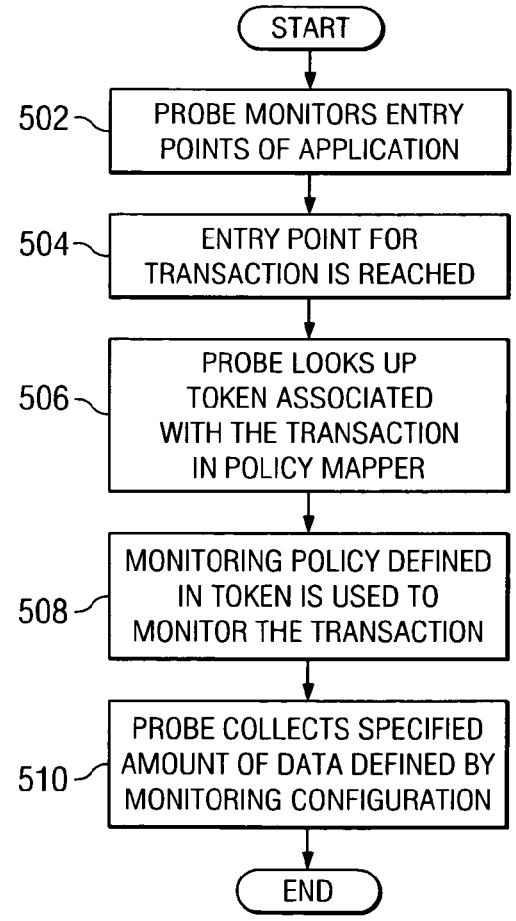
FIG. 5 shows process steps for implementing a preferred embodiment of the present invention.

FIG. 5 depicts a process flow for implementing a preferred embodiment of the present invention. First, the probe monitors the entry points of the application (step 502). In preferred embodiments, probes are developed to monitor a particular type of entry point. For example, a specific probe would be defined to monitor all classes that implement the servlet interface and a different probe would be defined to monitor all classes that implement a Web Services interface. A unique instance would be created in memory for each unique entry point that is monitored in the application. When the entry point for a transaction is reached (step 504), the probe is invoked and requests a token associated with the transaction from the policy mapper (step 506) using information about the transaction. The transaction (and in some embodiments, all related sub-transactions) is associated with the monitoring policy defined in the associated token to determine if the transaction should be monitored (step 508). Next, the probe collects the specified amount of data as defined by the monitoring configuration (step 510). The data gathered by the probe is sent to the monitoring application where it is stored to be viewed, at a later time or in real time, by the user of the monitoring application.

In a network environment, it is common that a transaction runs across multiple systems. On a single system, the sub-transactions are normally running within a process boundary. Thus, for a single system, it is possible to store the configuration token in some process specific data structure for it to be shared by all the sub-transactions on the local system. When a transaction flows across process boundaries, e.g., through Remote Method Invocation, one implementation to pass the configuration token is to piggyback it on the request string. Thus, the probe monitoring a sub-transaction running on the remote system will receive the same token retrieved by the probe for an upstream sub-transaction.

It is noted that this innovative system and method can be practiced across multiple physical systems involving multiple physical resources. It is also important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring an application operating on a computer system, the method comprising:

monitoring an entry point of the application for a transaction to selectively monitor the transaction within a plurality of transactions in the application in order to minimize computational overhead and data recording associated with monitoring all of the plurality of transactions in the application, wherein the entry point is a location in the application where the transaction is recorded by a monitoring application, and wherein each transaction in the plurality of transactions is associated with a corresponding token that includes data that uniquely identifies an associated transaction and contains configuration information required by a probe that monitors an entry point in the application where the associated transaction occurs to determine an appropriate level of data recording for the associated transaction;

responsive to the entry point being reached by the application for the transaction, acquiring a token associated with the transaction, wherein the token is acquired by looking up the transaction in a policy mapper, and wherein the policy mapper maps a monitoring policy to the transaction from a list of monitoring policies;

monitoring the transaction according to the monitoring policy of the token associated with the transaction, wherein the monitoring policy contains a host name, a user name, an application name, a transaction name, scheduling information that defines when the transaction is recorded, a threshold that defines an execution time limit for the transaction, and the configuration information that determines the appropriate level of data recording for the transaction, and wherein the monitoring policy of the token determines what specific information is gathered about the transaction, and wherein the transaction includes a plurality of sub-transactions, and wherein each sub-transaction within the plurality of sub-transactions is associated with the monitoring policy of the token;

collecting the appropriate level of data recording for the transaction defined by the configuration information; and sending the collected appropriate level of data recording for the transaction to the monitoring application, wherein the monitoring application records the collected appropriate level of data recording for the transaction for use by a user of the monitoring application.

2. A data processing system for monitoring transactions in an application, comprising:

a storage device connected to the bus system, wherein the storage device includes a set of instructions; and a processing unit connected to the bus system, the processing unit executes the set of instructions to
monitor an entry point of the application for a transaction to selectively monitor the transaction within a plurality of transactions in the application in order to minimize computational overhead and data recording associated with monitoring all of the plurality of transactions in the application, wherein the entry point is a location in the application where the transaction is recorded by a monitoring application, and wherein each transaction in the plurality of transactions is associated with a corresponding token that includes data that uniquely identifies an associated transaction and contains configuration information required by a probe that monitors an entry point in the application where the associated transaction occurs to determine an appropriate level of data recording for the associated transaction;

acquire a token associated with the transaction in response to the entry point being reached by the application for the transaction, wherein the token is acquired by looking up the transaction in a policy mapper, and wherein the policy mapper maps a monitoring policy to the transaction from a list of monitoring policies;

monitor the transaction according to the monitoring policy of the token associated with the transaction, wherein the monitoring policy contains a host name, a user name, an application name, a transaction name, scheduling information that defines when the transaction is recorded, a threshold that defines an execution time limit for the transaction, and the configuration information that determines the appropriate level of data recording for the transaction, and wherein the monitoring policy of the token determines what specific information is gathered about the transaction, and wherein the transaction includes a plurality of sub-transactions, and wherein each sub-transaction within the plurality of sub-transactions is associated with the monitoring policy of the token;

collect the appropriate level of data recording for the transaction defined by the configuration information; and send the collected appropriate level of data recording for the transaction to the monitoring application, wherein the monitoring application records the collected appropriate level of data recording for the transaction for use by a user of the monitoring application.

3. A computer program product stored in a computer readable storage medium for monitoring an application operating on a computer system, the computer program product comprising:

first instructions for monitoring an entry point of the application for a transaction to selectively monitor the transaction within a plurality of transactions in the application in order to minimize computational overhead and data recording associated with monitoring all of the plurality of transactions in the application, wherein the entry point is a location in the application where the transaction is recorded by a monitoring application, and wherein each transaction in the plurality of transactions is associated with a corresponding token that includes data that uniquely identifies an associated transaction and contains configuration information required by a probe that monitors an entry point in the application where the associated transaction occurs to determine an appropriate level of data recording for the associated transaction;

second instructions for, responsive to the entry point being reached by the application for the transaction, acquiring a token associated with the transaction, wherein the token is acquired by looking up the transaction in a policy mapper, and wherein the policy mapper maps a monitoring policy to the transaction from a list of monitoring policies;

third instructions for monitoring the transaction according to the monitoring policy of the token associated with the transaction, wherein the monitoring policy contains a host name, a user name, an application name, a transaction name, scheduling information that defines when the transaction is recorded, a threshold that defines an execution time limit for the transaction, and the configuration information that determines the appropriate level of data recording for the transaction, and wherein the monitoring policy of the token determines what specific information is gathered about the transaction, and wherein the transaction includes a plurality of sub-transactions, and wherein each sub-transaction within the plurality of sub-transactions is associated with the monitoring policy of the token;

fourth instructions for collecting the appropriate level of data recording for the transaction defined by the configuration information; and fifth instructions for sending the collected appropriate level of data recording for the transaction to the monitoring application, wherein the monitoring application records the collected appropriate level of data recording for the transaction for use by a user of the monitoring application.

* * * * *